United States Patent [19]
Furuya et al.

[11] Patent Number: 5,396,727
[45] Date of Patent: Mar. 14, 1995

[54] CASTING HANDLE FOR FISHING ROD

[75] Inventors: Hideyuki Furuya; Kunio Masuyama, both of Tokyo, Japan

[73] Assignee: Daiwa Seiko, Inc., Tokyo, Japan

[21] Appl. No.: 212,139

[22] Filed: Mar. 14, 1994

[30] Foreign Application Priority Data

Mar. 22, 1993 [JP] Japan .............................. 5-018423 U
Mar. 22, 1993 [JP] Japan .............................. 5-018424 U

[51] Int. Cl.⁶ ............................................. A01K 87/08
[52] U.S. Cl. ........................................ 43/23; D22/142
[58] Field of Search ..................... 43/22, 23; D22/142

[56] References Cited
U.S. PATENT DOCUMENTS

| | | | |
|---|---|---|---|
| 4,334,378 | 6/1982 | Worth .................................. | 43/22 |
| 4,646,462 | 3/1987 | Ohmura ............................... | 43/23 |
| 4,697,376 | 10/1987 | Brackett et al. ..................... | 43/23 |
| 4,817,324 | 4/1989 | Brackett et al. ..................... | 43/23 |
| 5,088,225 | 2/1992 | Yamamoto ...................... | 43/23 X |
| 5,291,684 | 3/1994 | Oyama ............................ | 43/22 X |
| 5,337,507 | 8/1994 | Oyama et al. ....................... | 43/23 |

FOREIGN PATENT DOCUMENTS 1-18699  4/1989 Japan .
1-98567  6/1989 Japan .
2-174624 7/1990 Japan .
3-24053  5/1991 Japan .

Primary Examiner—P. Austin Bradley
Assistant Examiner—Jeanne M. Elpel
Attorney, Agent, or Firm—Longacre & White

[57] ABSTRACT

A casting handle with a trigger includes a grip area section disposed behind the trigger, a rear section disposed in the rear of the grip area section, and a small-diameter intermediate section interposed between the grip area section and the rear section. The grip area section is expanded both vertically and laterally. The rear section has a vertical height less than the corresponding height of the grip area section. This forms a flat upper surface positioned sufficiently rearward with respect to the grip area section that the wrist of an angler's hand holding the casting handle does not interfere with the casting motion. The constricted cross-section, intermediate section has a lateral width and a vertical height respectively less than the corresponding width and height of the rear section. Consequently, the casting handle allows smooth casting, thumbing and pumping operations as well as improving the angler's ability to operate the fishing rod.

2 Claims, 2 Drawing Sheets

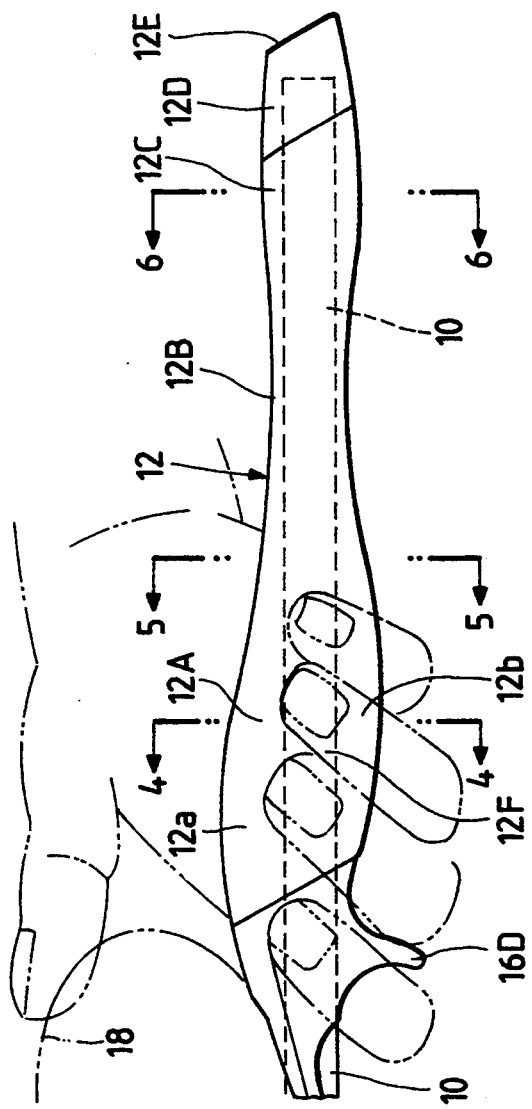
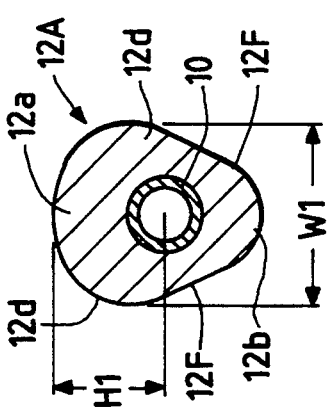
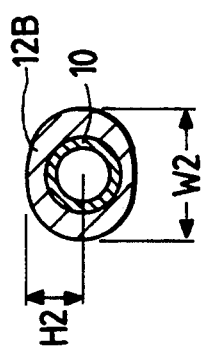
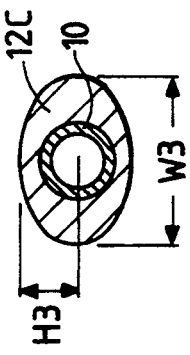

CASTING HANDLE FOR FISHING ROD

BACKGROUND OF THE INVENTION a) Field of the Invention

The present invention relates to the configuration of a casting handle, including a trigger, which is readily and comfortably grasped by an angler.

b) Description of the Prior Art

Various modifications have been suggested to redesign casting rod handles in order to enhance the ability of an angler to operate a casting rod.

Japanese Patent Kokoku Publication No. Hei. 3-24053 discloses a grip 1 used for two-handed casting.

Japanese Patent Kokoku Publication No. Hei. 1-18699 discloses a grip portion 3 connected to a reel mount portion 2 by an arrangement having a non-circular, transverse cross-section. The subject matter of this publication is directed to preventing relative rotation between the grip portion 3 and the reel mount portion 2. U.S. Pat. No. 4,646,462 is an english language equivalent of this publication.

Japanese Utility Model Kokai Publication No. Hei. 1-98567 discloses a grip portion 17 having several different, generally elliptical transverse cross-sections (FIGS. 4-6).

Grip portions having the aforementioned generally elliptical transverse cross-sections may be suitably grasped between the thumb and fingers of the angler's hand. These grip portions are not sufficient during a thumbing operation (i.e. placing the thumb in contact with the fishline) performed either during or after the act of casting, while holding a trigger by the index or forefinger, and a grip area behind the trigger by the middle, ring or third, and little fingers. These grip portions are also not sufficient during a sideward casting operation which uses the wrist of the hand grasping the handle.

In particular, in order to allow the thumb to perform the thumbing operation freely, the handle must be grasped and held by the remaining four fingers except for the thumb. However, during the act of fishing, the index finger is usually engaged with the trigger, therefore the handle is mainly held with the middle, ring and little fingers on the grip area of the handle. In the prior art, the oval or elliptic design of the grip area hinders the angler from strongly and effectively gripping the grip area with only three fingers. This makes it difficult to surely and smoothly perform the thumbing operation and the sideward-throw casting operation using the wrist.

Further, no particular attention in the prior art is given to the design of the casting handle in order to easily and comfortably perform a pumping operation after a fish is hooked.

SUMMARY OF THE INVENTION

Accordingly, it is an object of the invention to provide a casting handle which can be stably grasped by an angler, strongly and effectively holding the handle with only the middle, ring and little fingers, while permitting thumbing and other operations to be executed with ease.

In order to attain the above-noted and other objects, this invention provides a casting handle having a trigger extending downwardly from the casting handle, and a grip area section located behind the trigger which is adapted to be held by an angler's hand, possibly in conjunction with the trigger. The grip area section includes an upwardly expanded portion and a downwardly expanded portion, as well as right and left lateral sides. The downwardly expanded portion is displaced relative to the upwardly expanded portion such that the downwardly expanded portion is located slightly further from the trigger than the upwardly expanded portion along the longitudinal axis of the rod pipe. The right and left lateral sides are formed by generally planer surfaces, which taper downwardly toward one another, and smoothly connect with and extend between the upwardly expanded portion and the downwardly expanded portion. A profile of each of the upwardly and downwardly expanded portions is a convex curve lying in a plane containing the longitudinal axis of the casting handle.

The grip area section includes the upwardly and downwardly expanded portions and the two side portions formed by the substantially planer surfaces presenting an upright V-shaped cross-section. Consequently, the casting handle according to the present invention can be strongly and effectively held in the natural bend of only the middle, ring and little fingers.

This invention further provides a casting handle with a trigger extending downwardly, the casting handle comprising: a grip area section located behind the trigger and adapted to be grasped together with the trigger by an angler's hand, wherein the grip area section is expanded laterally and vertically to define a first maximum lateral width and a first maximum vertical height; a rear section having a relatively flat upper surface so as not to contact the wrist of the angler's hand grasping the casting handle, said grip area section is interposed between the rear section and the trigger along a longitudinal direction of the casting handle, the rear section has a second maximum lateral width and a second maximum vertical height, wherein the second maximum lateral width is not greater than the first maximum lateral width and the second maximum vertical height is less than the first maximum vertical height; and a constricted cross-section, intermediate section smoothly connecting the grip area section and the rear section, the constricted cross-section, intermediate section has a minimum lateral width and a minimum vertical height, wherein the minimum lateral width is less than the second maximum lateral width and the minimum vertical height is less than the second maximum vertical height.

An angler can hold the grip area section effectively and stably because the grip area section is expanded outwardly in the vertical direction as well as in the lateral or transverse direction. Adjoining the grip area section is the constricted cross-section, intermediate section. During an act of casting in which the angler's wrist twists, the casting handle moves across, but does not interfere with the angler's wrist and arm. Further, since the vertical height of the rear section is less than the vertical height of the grip area section, and the lateral width of the rear section is also not greater than the lateral width of the grip area section, the rear section of the casting handle is prevented from interfering with the angler's arm or the like during the act of casting.

The rear section is sufficiently distanced from the grip area section along the longitudinal direction to avoid interfering with the wrist of the angler's hand grasping the grip area section. Further, the upper surface of the rear section is made relatively flat so that during fishing (after the casting operation), the angler can smoothly perform a pumping operation or the like with only one hand, such that the relatively flat surface of the rear section is kept in abutment with the lower surface of the angler's arm.

Throughout this disclosure, the "longitudinal axis of the rod" refers to the axis of revolution extending along the elongated length of the rod. The term "forward" implies toward the tip end of the rod, and "rearward" implies toward the butt end of the rod. The "vertical direction" is defined as a plane containing the longitudinal axis of the rod that also symmetrically bisects the fish line guides commonly known to be used along the longitudinal axis of the rod. Consequently, "upward" refers to a vector extending orthogonally from the longitudinal axis of the rod, in the vertical direction, toward the reel 18. The term "lateral" refers to either side of the vertical direction.

BRIEF DESCRIPTION OF THE DRAWINGS

FIG. 3 is a side view of a casting handle according to the present invention, showing positional relationships of casting handle sections 12A, 12B and 12C with respect to an angler's hand.

FIG. 4 is a transverse section view taken along line 4—4 in FIG. 3.

FIG. 5 is a transverse section view taken along line 5—5 in FIG. 3.

FIG. 6 a transverse section view taken along line 6—6 in FIG. 3.

DETAILED DESCRIPTION OF THE PREFERRED EMBODIMENT

Figure 1:
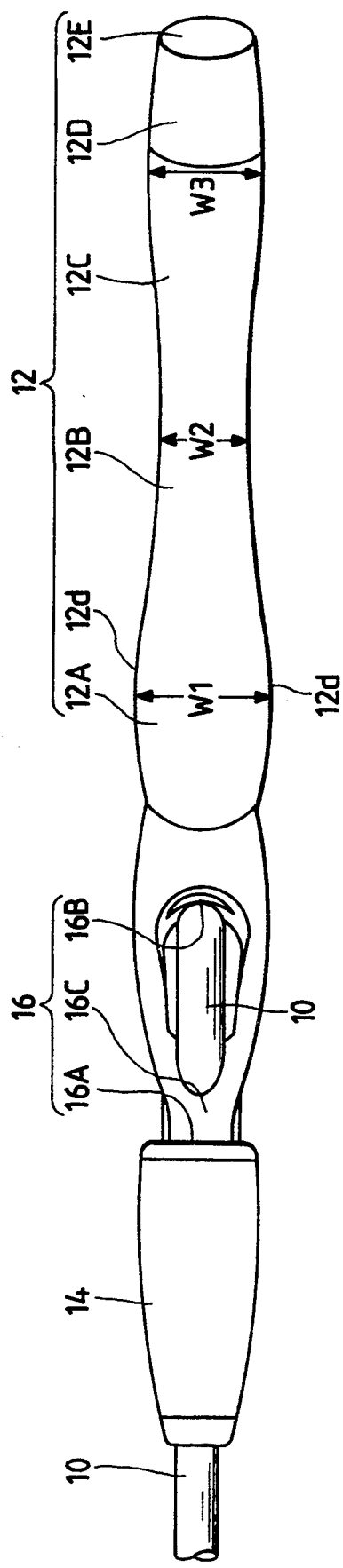
FIG. 1 is a plan view of a casting handle according to the present invention.
Figure 2:
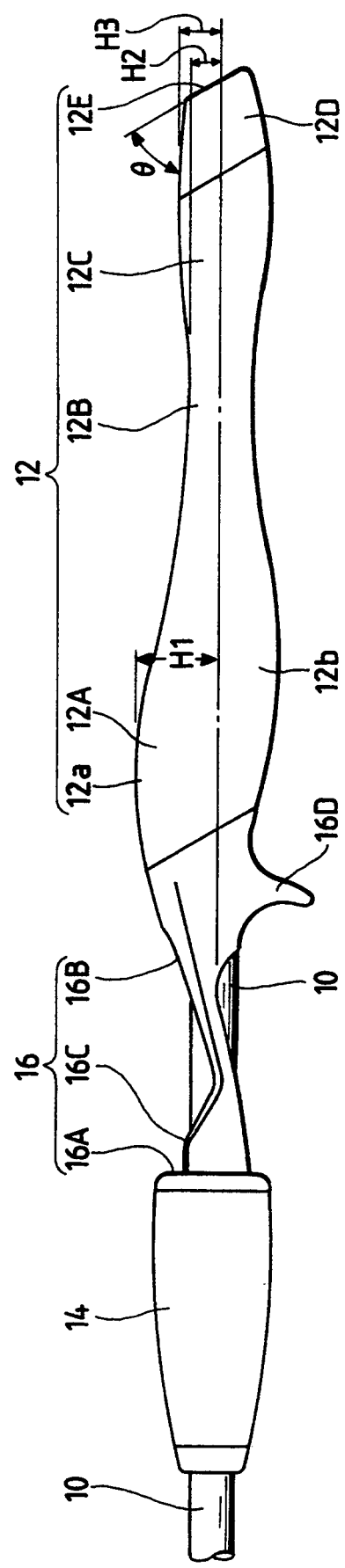
FIG. 2 side view of a casting handle according to the present invention.

Description of the present invention is given hereinbelow with reference to the exemplary views of a casting handle as shown in the accompanying drawings.

According to the present invention, a reel leg fixing member 16, which may be composed of hard resin, is fixed to a rod pipe 10. A front grip 14, which may be composed of an elastic material such as cork or the like, is located forward of the reel leg fixing member 16 and is mounted on the rod pipe 10 in such a manner as to be relatively movable (e.g. the rod pipe 10 and the front grip 14 may be engaged via a screw thread). A handle grip 12, which may be composed of an elastic material such as cork or the like, is located rearward of the reel leg fixing member 16 and is also fixed to the rod pipe 10.

The reel leg fixing member 16 includes a reel leg placement section 16C formed as an upward facing surface, and also includes a fixed hood 16B at the rear of the reel leg fixing member 16 for receiving one reel leg end portion (not shown) of a reel 18. The reel leg fixing member 16 further includes a hood 16A which is relatively movable with respect to both the front grip 14 and reel leg placement section 16C, and which receives the second reel leg end portion (not shown). Upon suitable displacement of the front grip 14 with respect to the rod pipe 10, the reel leg (not shown) is fastened between the hoods 16A and 16B so as to be held firmly against the reel leg placement section 16C.

The handle grip 12 is conterminous with the reel leg fixing member 16, and includes a grip area section 12A proximate to a trigger portion 16D. The grip area section 12A includes laterally expanded portions 12d, an upwardly expanded portion 12a extending from the rear portion of the reel leg fixing member 16 defining the upper surface of the handle grip 12, and a downwardly expanded portion 12b displaced slightly rearward along the longitudinal axis of the rod pipe 10 relative to the upwardly expanded portion 12a.

The handle grip 12 further includes a constricted cross-section, intermediate section 12B extending along the longitudinal axis of the rod pipe 10 rearward from the grip area section 12A. A rear section 12C is disposed opposite the grip area section 12A with respect to the intermediate section 12B, also along the longitudinal axis of the rod pipe 10. An end section 12D, which may be composed of synthetic resin or foamed synthetic resin for high strength and high wear resistance, is fixed to the rod pipe 10 rearward of the rear section 12C to protect the softer material of the rear section 12C against accidental contact with a rock or the like. By virtue of the rod pipe 10 extending through all of the sections 12A, 12B, 12C and 12D, handle strength is sufficient even if sections of the handle grip 12 are formed of a soft material such as cork. The end section 12D further includes a generally rearward facing surface 12E which is inclined at an angle $\theta$ with respect to the longitudinal axis of the rod pipe 10. Preferably, $\theta$ is in the range of 45 to 70 degrees so that the surface 12E may be comfortably abutted against the angler's abdomen region, thereby providing a pivot for executing a pumping operation while reeling in the catch, or other operations which require a pivot.

The constricted cross-section, intermediate section 12B of the handle grip 12 is more narrow than the grip area section 12A or the rear section 12C in both the vertical direction as well as the lateral direction. Inadvertent contact with the angler's arm while casting is avoided by the constricted cross-section, intermediate section 12B.

The rear section 12C of the handle grip 12 is intermediately sized, in both the vertical direction as well as the lateral direction, as compared to both the grip area section 12A and the constricted cross-section, intermediate section 12B. Further, as shown in FIG. 6, the rear section 12C is expanded in the lateral direction relatively more than the vertical direction so that the rear section 12C can be comfortably rested against the lower surface of the angler's arm.

Specifically, the lateral width W3 of the rear section 12C is less than the lateral width W1 of the grip area section 12A. Further, the lateral width W2 of the constricted cross-section, intermediate section 12B is less than the lateral width W3. The constricted cross-section, intermediate section 12B may be so narrowed as to expose the rod pipe 10.

The rear section 12C is configured so that the vertical height H3 of the rear section 12C with respect to the longitudinal axis of the rod pipe 10 is less than the corresponding height H1 of the grip area section 12A. Also, the corresponding height H2 of the constricted cross-section, intermediate section 12B is less than the height H3. The height H2 may also be zero, such that the rod pipe 10 is exposed.

In the act of casting, while holding the casting handle according to the present invention as shown in FIG. 3, the angler's index finger is disposed against the trigger 16D at the lower, rear portion of the reel leg fixing member 16, while the middle, ring and little fingers are engaged with the grip area section 12A rearward of the trigger 16D. The right and left lateral sides of the grip area section 12A are formed as generally planer surfaces or in gently curved surfaces 12F thereby presenting an upright, generally V-shaped cross-section as shown in FIG. 4. The right and left lateral sides 12F of the grip area section 12A smoothly merge with the upwardly and downwardly expanded portions 12a and 12b, respectively.

The right and left lateral sides 12F merge with the upwardly expanded portion 12a at positions generally above the horizontal plane which includes the longitudinal axis of the rod pipe 10. The right and left lateral sides 12F merge with each other generally below the same horizontal plane to present the smooth rounded face of the above-mentioned downwardly expanded portion 12b.

The present invention has the advantage of comfortably accommodating the natural bend of the angler's fingers appropriate for grasping the casting handle. Specifically, the lateral sides 12F, which are engaged with the middle, ring and little fingers in the act of casting, are respectively formed into relatively planer portions which generally taper downwardly to present a V-shaped cross-section so that the fingers can effectively and strongly grasp the handle grip 12 during casting, etc. Thus, the casting handle can be held strongly by the aforementioned three fingers, with or without the index finger engaged with the trigger 16D. This increases the freedom of the remaining digit, i.e. the thumb, to engage the fishline for the purposes of sensing changes in the tension on the fishline, and/or applying a braking force opposing rotation of the spool. Especially when employing side casting techniques or under-hand casting techniques, the present invention enables the angler to perform casts with ease using only the wrist.

The constricted cross-section, intermediate section 12B and rear section 12C are formed such that the height of each of their cross-sections, H2 and H3 respectively, is a fraction their corresponding widths, W2 and W3. Further, the minimum wall thickness of each of their cross-sections is substantially less than that of the grip area section 12A. This minimizes the possibility that either the constricted cross-section, intermediate section 12B or rear section 12C can interfere with the motion of the wrist and arm during the act of casting. Also, after the cast has been executed, the relatively flat upper surface of the rear section 12C, as best shown in FIG. 6, may be rested against the lower surface of the angler's arm to further improve the angler's ability to operate the casting handle, e.g. while executing a pumping movement.

The displacement along the longitudinal axis between the upwardly expanded portion 12a and the downwardly expanded portion 12b conforms to the angler's hand thereby further facilitating a comfortable grasp of the grip area section 12A.

According to the present invention, the grip area section of the casting handle is expanded outward so that the casting handle can be held properly. Also, since the intermediate section of the casting handle, as well as the further rearward portion have relatively smaller sectional dimensions than the grip area section, the casting handle cannot interfere with or be caught on the arm during the act of casting. That is, the casting handle is configured so as not to impede casting. Further, because the flat upper surface of the rear portion can be abutted against the lower surface of the arm, the ability to operate the casting handle after casting is also improved.

What is claimed is:

1. A casting handle attached to a fishing rod having a tip end, a butt end, and a longitudinal axis extending between the tip end and the butt end, said casting handle comprising:
   a trigger extending radially outward from the fishing rod in a downward direction; and,
   a grip area section located along said longitudinal axis and interposed between the butt end and said trigger, said grip area section together with the trigger are to be held in an angler's hand, the grip area section including:
     an upwardly expanded portion projecting in an upward direction opposite to said downward direction;
     a downwardly expanded portion projecting in said downward direction and displaced along the longitudinal axis relative to said upwardly expanded portion such that said downwardly expanded portion is located further from said trigger, toward the butt end, than said upwardly expanded portion;
     each of said upwardly and downwardly expanded portions having a convex profile with respect to said longitudinal axis as viewed in a vertical plane along said longitudinal axis; and,
     right and left side portions disposed on opposite sides of said longitudinal axis when viewed in a direction transverse to said longitudinal axis, said side portions tapering toward one another in said downward direction and smoothly connecting said upwardly expanded portion with said downwardly expanded portion, wherein each side portion is formed by a substantially planer surface, and wherein said side portions define a maximum lateral width at a location above said longitudinal axis.

2. A casting handle attached to a fishing rod having a tip end, a butt end, and a longitudinal axis extending between the tip end and the butt end, the casting handle comprising:
   a trigger extending generally radially outward from the longitudinal axis in a downward direction;
   a grip area section located along said longitudinal axis and interposed between the butt end and said trigger, said grip area section together with the trigger are to be held in an angler's hand, the grip area section is expanded laterally and vertically to define a first maximum lateral width and a first maximum vertical height;
   a rear section located along the longitudinal axis and interposed between said grip area section and the butt end, said rear section having a relatively flat upper surface so as not to interfere with an angler's wrist while casting, said rear section having a second maximum lateral width and a second maximum vertical height, said second maximum lateral width is not greater than said first maximum lateral width and said second maximum vertical height is less than said first maximum vertical height; and
   a constricted cross-section, intermediate section interposed between and smoothly connecting said grip area section and said rear section, said constricted cross-section intermediate section having a minimum lateral width and a minimum vertical height, said minimum lateral width is less than said second maximum lateral width and said minimum vertical height is less than said second maximum vertical height.

* * * * *